US006002766A

United States Patent [19]
Orr et al.

[11] Patent Number: 6,002,766

[45] Date of Patent: *Dec. 14, 1999

[54] PACKAGE CONTAINING SOUVENIR POSTCARD AND MATCHING PHONE CARD

[75] Inventors: Peter W. Orr, Van Nuys; Daniel Zipser, Westlake Village, both of Calif.

[73] Assignee: Spartacus Management Company, Chatsworth, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/851,883

[22] Filed: May 6, 1997

[51] Int. Cl.$^{6}$ .................. H04M 1/00

[52] U.S. Cl. .................. 379/457

[58] Field of Search .................. 379/447, 456, 379/441, 450, 457; 40/771; 206/45.31, 45.33

[56] References Cited

U.S. PATENT DOCUMENTS

| | | | |
|---|---|---|---|
| 4,848,014 | 7/1989 | Yesbick . | |
| 4,918,299 | 4/1990 | Ohmori . | |
| 4,979,619 | 12/1990 | Hager . | |
| 5,205,059 | 4/1993 | Doll | 40/771 |

*Primary Examiner*—Jack Chiang
*Attorney, Agent, or Firm*—Jeffer, Mangels, Butler & Marmaro LLP

[57] ABSTRACT

A package is disclosed containing a picture postcard and a prepaid telephone card, both the postcard and the telephone card bearing the same illustration. The package is of transparent plastic for simultaneous viewing of both the postcard and the telephone card. The postcard can be removed and mailed the same as any souvenir card and the telephone card, which may be wallet size, can be put in one's wallet or purse and used to make prepaid telephone calls.

12 Claims, 2 Drawing Sheets

PACKAGE CONTAINING SOUVENIR POSTCARD AND MATCHING PHONE CARD

BACKGROUND OF THE INVENTION

1. Field of the Invention

The invention relates to packaging for consumer products.

2. Background Information

Postal cards which bear a scene or the like on one side and a place for a message and an address to which the card can be sent are well known. In recent years, prepaid telephone cards have become quite popular. These phone cards are usually sold separately in retail stores. These cards can be used in certain public telephones to make prepaid long distance calls. Such stores also carry postcards bearing images associated with the geographical location in which such postcards are sold.

Since there is much competition for the sale of phone cards, there is a need to make phone cards more saleable to the buying public. There is quite a bit of competition for display space in retail stores where such cards are sold. Also, such prepaid phone cards are usually an impulse buy item and displayed in stores near the checkout counters. There is a need for catching the attention of a shopper so that the shopper will buy such prepaid phone cards.

SUMMARY OF THE INVENTION

It is an object of this invention to provide a package containing both a souvenir postcard and a matching prepaid telephone card.

It is still a further object of this invention to provide a package which is transparent with both the postcard and the prepaid telephone card visible to the public when such package is displayed in a store or the like.

It is another object of this invention to carry out the foregoing objects wherein the public can collect such postcards, mail them or keep them, and use the telephone card to place long distance calls, then save such phone cards as a collectible souvenir.

These and other objects are preferably accomplished by providing a package containing a picture postcard and a prepaid telephone card, both the postcard and the telephone card bearing similar indicia, such as a pictorial presentation. The package is of transparent plastic for simultaneous viewing of both the postcard and the telephone card. The postcard can be removed and mailed the same as any souvenir card and the telephone card, which may be wallet size, can be put in one's wallet or purse and used to make prepaid telephone calls. The postcard thus can be either mailed to another or saved as a souvenir. The prepaid phone card, after use, may also be saved as a collectible.

DESCRIPTION OF THE PREFERRED EMBODIMENT

Figure 1:
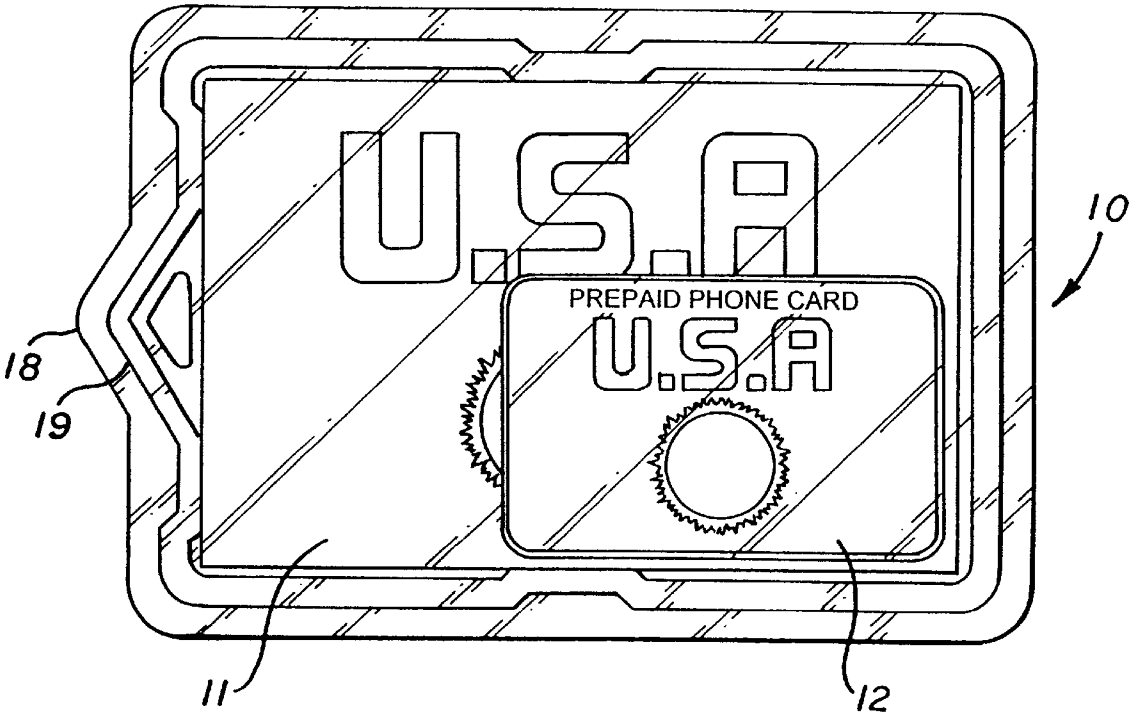
FIG. 1 is a front elevational view of a package containing a souvenir postcard and matching phone card in accordance with the teachings of the invention.
Figure 2:
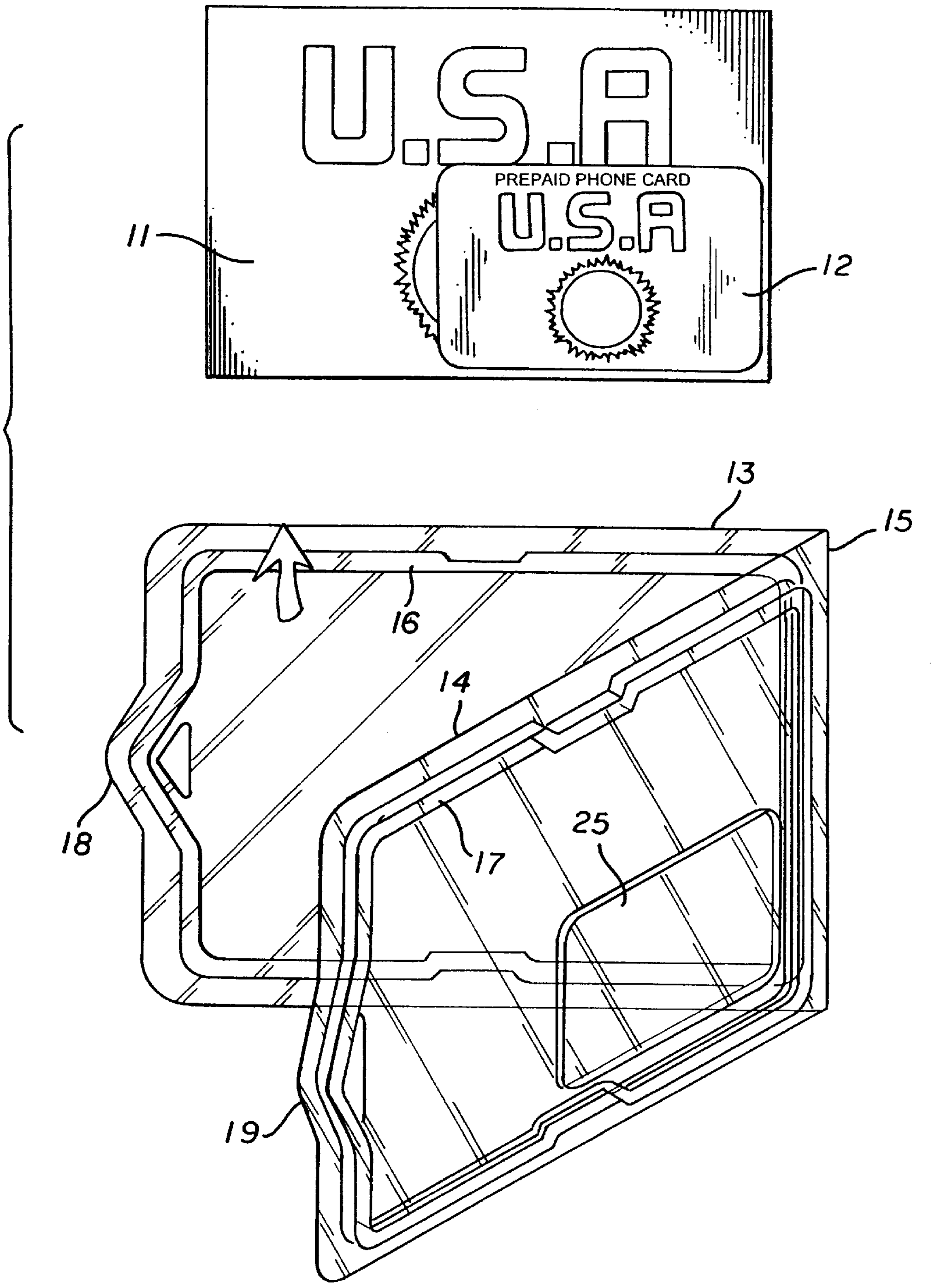
FIG. 2 is an exploded view of the package of FIG. 1, the cards being removed from the package.

Referring now to FIG. 1 of the drawing, a single package 10 is shown having a postal card 11 and a prepaid telephone card 12 disposed therein. Any suitable package can be used. However, both postal card 11 and telephone card 12 are preferably visible so that the package presents an enticing appearance to the potential buyer. Thus, as seen in FIG. 2, package 10 may be comprised of a pair of panels 13, 14 hinged at integral hinge 15 having inner peripheral ridges 16 on one panel, such as panel 13, and inner peripheral grooves 17 on the other panel, such as panel 14, adapted to mate and interlock to close package 10. The panels 13, 14 can be quickly and easily separated by peeling them apart along edges 18, 19, respectively, (see also FIG. 1) as is well known in the art. Thus, package 10 may be made of a transparent plastic material, preferably heat sealed about the edges for security and easily peeled apart to provide access to postal card 11 and phone card 12. Thus, as seen in FIGS. 1 and 2, postal card 11 fits into the inner area of panel 13 bordered by ridge 16. Any suitable dimensions may be used but preferably postal card 11 is 4" by 6" as are conventional souvenir picture postcards.

Card 12 is smaller so that it can be carried in one's wallet or a purse or the like and is generally about 3⅜" by 2⅛". Card 12 is retained in a rectangular compartment 25 (FIG. 2) stamped or otherwise formed in panel 14 (extending outwardly away from panel 13).

Figure 3:
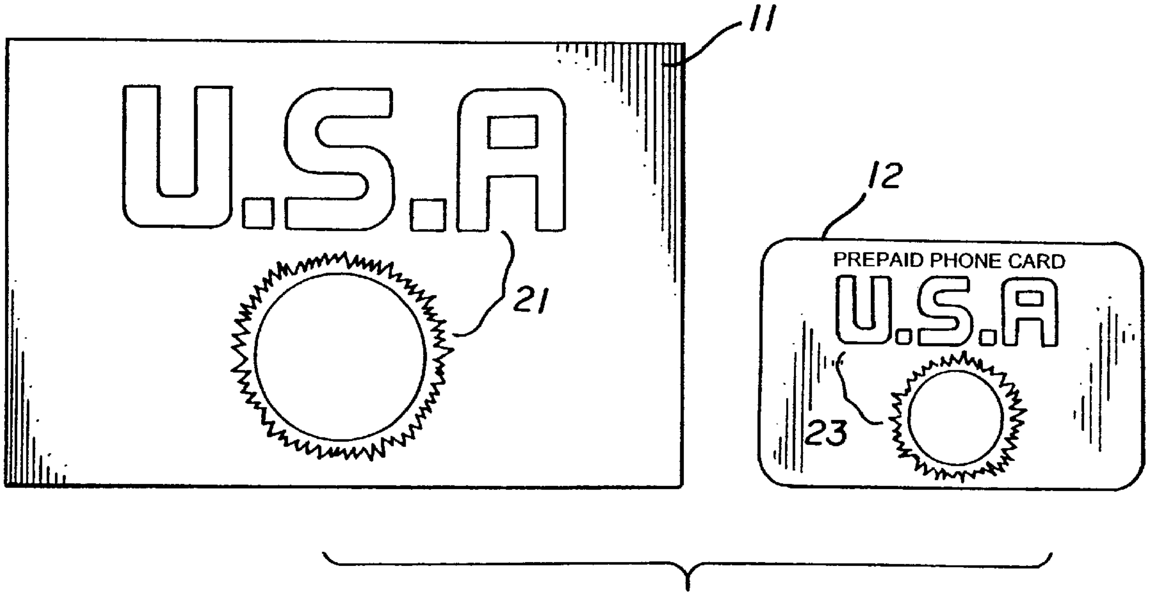
FIG. 3 is a front elevational view of the postcard and phone card of FIGS. 1 and 2 removed from the package of FIG. 1.

As seen in FIG. 3, card 11 has indicia 21 thereon which may be a scene or image having geographical or historical significance for the area in which package 10 are to be sold. Thus, for example, card 11 in FIG. 3 has a simulated stylized sun and the letters U.S.A. Card 11 may have indicia on the back thereof for writing a message, addressing the card to an addressee, etc.

Card 12, FIG. 1, has indicia 22 in the form of a scene preferably similar to that appearing on card 11, e.g., the sun and U.S.A. However, the words "Prepaid Phone Card" preferably appear on card 12. Other indicia, such as the company issuing the phone card, the price of the card, etc., may additionally appear on the card. Telephone instructions may appear on the back of the card. The actual location of any indicia, on the front or back, of either cards 11, 12 is arbitrary; however, the scenes displayed on both cards, such as the sun and U.S.A., are the same. The colors used may be those normally associated with the scene depicted, e.g., orange for the sun, etc.

The indicia may be any scenic depiction, such as a photograph, artwork, painting, etc.

Obviously, package 10 is directed to the tourist industry who will see such packages in stores or the like located at tourist spots throughout the world. The buyer will see a scene having some significance to the area, buy the package, mail or save the postcard, then pocket the phone card to make long distance calls. After the calls are made, the user can save the phone card as another souvenir or collectible. The phone cards may of course be of any suitable duration, good for both domestic and international calls, priced accordingly. The postcard is used separately as a souvenir.

Although a particular embodiment of the invention is disclosed, variations thereof may occur to an artisan and the scope of the invention is only limited by the scope of the appended claims.

We claim:

1. A consumer package to be purchased by a consumer as a single unit, said package comprising:

a first compartment containing a removable postal card therein, said postal card having a pictorial presentation on at least one side thereof; and said package having a second compartment containing a removable prepaid telephone card therein, said telephone card having a pictorial presentation on at least one side thereof that matches the pictorial presentation on said postal card.

2. The package of claim 1 wherein said package is of a transparent material, the pictorial presentation on said at least one side of said postal card being partially visible from an exterior of said package and the pictorial presentation on said at least one side of said phone card being visible from the exterior of said package.

3. The package of claim 2 wherein said first compartment is a first panel of said package having first selectively closable means extending about the inner periphery thereof surrounding said postal card and said second compartment is provided in a second panel hingedly secured to said first panel having second selectively closable means adapted to mate with said first selectively closable means extending about the inner periphery thereof, said second compartment being a rectangular cavity formed in the second panel extending outwardly away from the interior of said package, said telephone card being substantially smaller than said postal card.

4. The package of claim 3 wherein said postal card is about 4" by 6" and said telephone card is about 3⅜" by 2⅛".

5. The package of claim 4 wherein said second compartment is oriented in the lower right corner of said package when said panels are in mating relationship and said pictorial presentation on both said postal card and said telephone card are visible to the exterior of said package.

6. The package of claim 1 wherein said postal card is about 4" by 6" and said telephone card is about 3⅜" by 2⅛".

7. A consumer package to be purchased by a consumer as a single unit, said package comprising both a removable postal card having a pictorial presentation on at least one side thereof and a removable prepaid telephone card having a pictorial presentation on at least one side thereof.

8. The package of claim 7 wherein said package is a single package of a transparent material, the pictorial presentation on said at least one side of said postal card being partially visible from an exterior of said package and the pictorial presentation on said at least one side of said phone card being visible from the exterior of said package.

9. The package of claim 7 wherein said pictorial presentation on said postal card material the pictorial presentation on said phone card.

10. A consumer package to be purchased by a consumer as a single unit, said package comprising:

a first compartment having a removable postal card therein, said postal card having a pictorial presentation on at least one side thereof; and said package having a second compartment containing a removable prepaid telephone card therein, said telephone card having a pictorial presentation on at least one side thereof.

11. The package of claim 10 wherein said package is of a transparent material, the pictorial presentation on said at least one side of said postal card being partially visible from an exterior of said package and the pictorial presentation on said at least one side of said phone card being visible from the exterior of said package.

12. The package of claim 10 wherein said pictorial presentation on said postal card matches the pictorial presentation on said phone card.

* * * * *